United States Patent [19]

Long et al.

[11] 4,376,236

[45] Mar. 8, 1983

[54] MULTIPLE FUNCTION SWITCH ASSEMBLY

[75] Inventors: Donald A. Long; Thomas R. Sowash, both of Anderson, Ind.

[73] Assignee: General Motors Corporation, Detroit, Mich.

[21] Appl. No.: 271,685

[22] Filed: Jun. 8, 1981

[51] Int. Cl.³ .......................... H01H 3/12; H01H 9/00
[52] U.S. Cl. ..................................... 200/61.27; 200/4
[58] Field of Search ............... 200/5 R, 6 A, 4, 61.27, 200/61.3, 61.34, 61.35, 61.54

[56] References Cited

U.S. PATENT DOCUMENTS

| | | | |
|---|---|---|---|
| 2,851,674 | 9/1958 | Boone | 200/6 A X |
| 3,858,176 | 12/1974 | Miller et al. | 200/61.27 X |
| 4,124,787 | 11/1978 | Aamoth | 200/6 A |
| 4,149,048 | 4/1979 | Winter et al. | 200/4 X |
| 4,179,592 | 12/1979 | Nitsch | 200/61.27 |
| 4,204,099 | 5/1980 | Cryer | 200/4 |
| 4,238,650 | 12/1980 | Cryer et al. | 200/4 |
| 4,273,971 | 6/1981 | Tregurtha | 200/4 |
| 4,293,743 | 10/1981 | Iwata et al. | 200/4 |

Primary Examiner—J. R. Scott
Attorney, Agent, or Firm—Warren D. Hill

[57] ABSTRACT

A combination turn signal switch and dimmer switch assembly for automotive vehicles comprises a two part lever comprising an actuator and a handle. The actuator is pivoted to a switch housing for rocking movement about an axis on either side of a neutral position for selective turn signal switch actuation. The handle is pivoted to the actuator about an axis transverse to the actuator pivot axis and is movable between a neutral position and a dimmer switch actuation position. The handle has a V-shaped ramp surface engaged by a leaf spring which serves to press the handle toward its neutral position as well as to cam the actuator toward its neutral position. The turn signal switches are keyboard switches mounted on a printed circuit board secured to the housing. The switches are spaced below the path of the actuator and are actuated by forces perpendicular to the actuator path. Spring elements or flexible levers secured to the circuit board and contacting the switches extend into the actuator path. Deflection of a flexible lever by actuator movement transfers actuating force to the corresponding switch.

3 Claims, 7 Drawing Figures

MULTIPLE FUNCTION SWITCH ASSEMBLY

BACKGROUND OF THE INVENTION

This invention relates to a multiple function switch for controlling vehicle functions.

It is already known to use a single switch lever for the operation of vehicle turn signals and other vehicle functions such as headlamp dimming by actuating one switch when the lever is pivoted about one axis and another switch when the lever is pivoted about a different axis appropriate linkages being used in each case to couple the lever to a conventional switch. Usually, for each degree of freedom of the lever, an independent spring mechanism is required to return the lever toward a neutral position.

It is an object therefore to provide a multiple function switch having a simplified unitary spring arrangement for returning the switch lever to a neutral position.

The invention is carried out by providing a two piece lever for actuating turn signal switches as well as another vehicle function switch wherein each part of the lever pivots about a different axis and one part of the lever carries a ramp surface which is acted upon by a spring which pushes that one lever part to its neutral position and cams the other lever part to its neutral position.

BRIEF DESCRIPTION OF THE DRAWINGS

The above and other advantages will be made more apparent from the following specification taken in conjunction with the accompanying drawings wherein like reference numerals refer to like parts and wherein.

DESCRIPTION OF THE PREFERRED EMBODIMENTS

Figure 1:
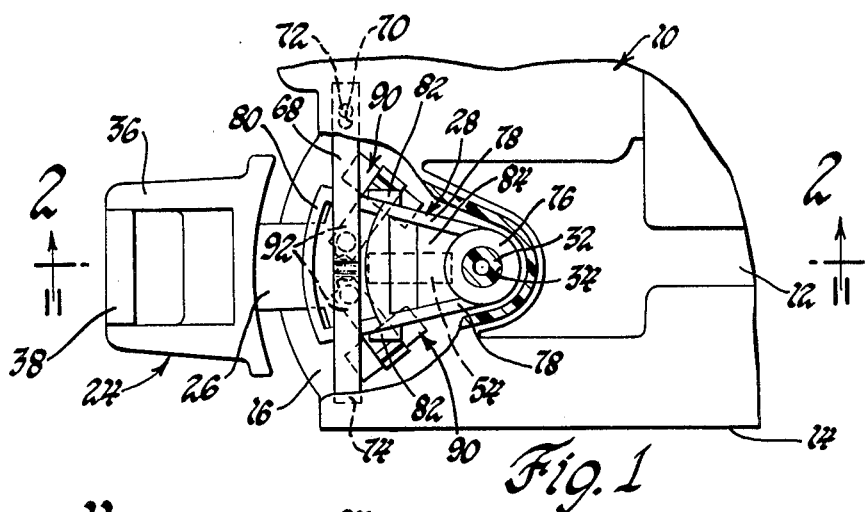
FIG. 1 is a partially broken away plan view of a multiple function switch for use in a vehicle according to the invention.
Figures 2, 3:
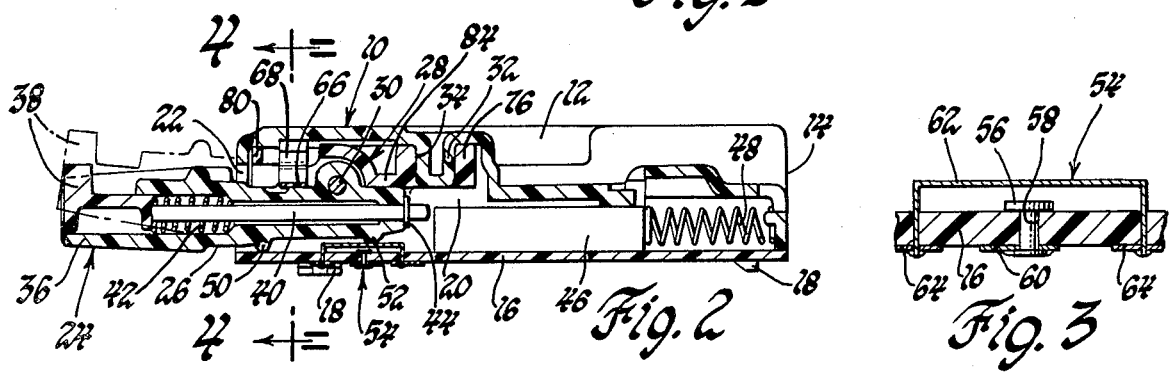
FIG. 2 is a cross-sectional elevation view of the switch of FIG. 1 taken along lines 2—2.
FIG. 3 is a detailed view of a switch structure of FIG. 2.
Figure 4:
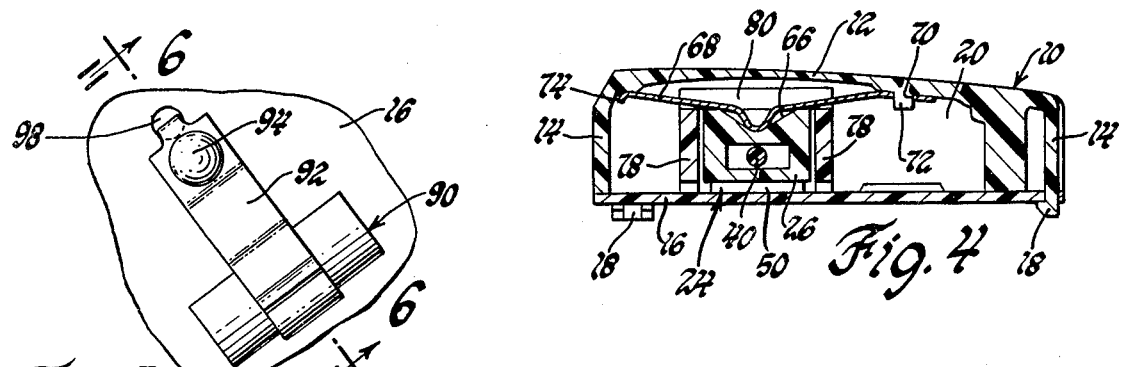
FIG. 4 is a cross-sectional view of the switch of FIGS. 1 and 2 taken along lines 4—4 of FIG. 2.

FIGS. 1, 2 and 4 show the overall switch structure of a vehicle turn signal switch mechanism combined with a switch mechanism for another vehicle function such as headlight dimming. A molded polymer housing 10 has a top portion 12 and integral side walls 14. A rigid printed circuit board 16 is fastened to the lower ends of the side walls 14 by locking tabs 18 which depend from the side walls and engage the undersurface of the circuit board 16. The housing 12 and circuit board 16 together comprise a support for the switching mechanism and define a switch cavity 20. One of the side walls has an opening 22 through which a turn signal switch lever 24 extends.

The lever 24 comprises a handle portion 26 and an actuator portion 28 which are pivotally connected by a pivot pin 30 which lies parallel to the circuit board 16 and transverse to the longitudinal axis of the lever 24. A pin 32 molded integrally with the housing 10 extends into the switch cavity 20 and defines a pivot axis perpendicular to the circuit board 16. The actuator 28 has a bore 34 at its inner end pivotally coupled to the pin 32 to allow rocking of the lever about the pivot axis. The outer end of the handle 26 terminates in a generally rectangular flat knob 36 which is recessed to receive a sliding switch control element 38. An arcuate rib 50 integrally formed on the lower surface of the handle 26 rests against the circuit board 16 in sliding relation thereto upon the pivoting or rocking movement of the lever 24 about the pivot pin 32. Also in the lower surface near the inner end of the handle 26, an abutment 52 extends toward the circuit board 16. The upper surface of the handle outboard of the pivot pin 32 has a V-shaped ramp surface 66 with its lowest part aligned with the center line of the handle. A leaf spring 68 having an eyelet 70 at one end which fits over a peg 72 on the inner surface of the housing 10 has a center portion which rides in the V-shaped ramp 66 and another end 74 which freely slides on the inner surface of the housing 10. The spring 68 is in the form of a shallow V with a rounded apex which slidably bears on the ramp surface 66. The spring 68 is stressed upon assembly of the switch mechanism so that it urges the handle portion into its neutral position as shown in full line section in FIG. 2 and yet allows the handle to be tilted upwardly as shown in the phantom outline of FIG. 2 to pivot the handle about the pin 30 and actuate a switch 54 by the abutment 52.

The actuator 28 has a hub 76 containing the pivot hole 34, a pair of side walls 78 flaring outwardly from the hub to a bridge 80 interconnecting the walls, and a pair of bosses 82 on the side walls into which the pin 30 is journalled. A reinforcing web 84 between the side walls 78 near the hub 76 terminates short of the leaf spring 68 to leave an opening between the web 84 and the bridge 80 for the leaf spring 68 to extend down to the ramp surface 66. Thus, in operation when the lever is moved from side to side for selective operation of turn signal switches, the actuator pivots about the pin 32 and the apex of the spring 68 rides up the ramp 66 of the handle 26 thereby flexing the spring and producing a camming action which urges the handle back toward neutral position when the lever is manually released.

The handle 26 is hollow throughout its length and contains a push rod 40 which is connected to the element 38 and extends through the switch cavity. A coil spring 42 under compression biases the push rod outwardly while a spring clip 44 on the inner end of the rod 40 prevents the unlimited travel of the rod 40 in the outward direction. A sliding switch mechanism 46 in the cavity inboard of the push rod 40 and in line with the push rod is biased toward the push rod by a coil spring 48 trapped between the switch element 46 and a side wall 14 of the housing. Thus, the switch element 46 which may be used for any desired vehicle function such as windshield washers or vehicle speed control is actuated by mainpulation of the slider element 38.

A push button keyboard switch 54 is secured to the circuit board beneath the abutment 52. As best shown in FIG. 3, the keyboard switch 54 comprises a stationary contact button 56 inserted in an opening 58 in the circuit board 16 and terminating on the lower surface of the circuit board where it is soldered to a printed circuit conductor 60. A bridging contact 62 is generally U- shaped and has both ends extending through the circuit board 16 for connection to circuit pathways 64 while the middle of the bridging contact straddles the button contact 56 and is normally slightly spaced from it. Force from the abutment 52 against the bridging contact 62 causes it to flex into engagement with the button contact 56 thereby closing the switch. The bridging contact is formed to effect the switch closing with a snap action and to return to the open position as soon as the force is removed.

Figures 5, 6:
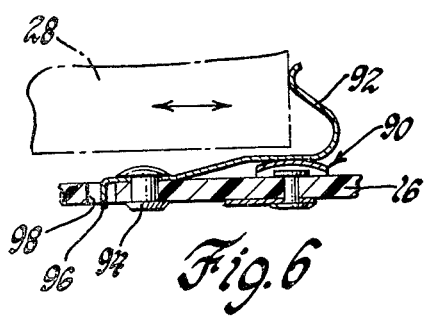
FIG. 5 is a plan view of a turn signal switch actuator detail according to the invention.
FIG. 6 is a cross-sectional elevational view of the turn signal actuator detail taken along lines 6—6 of FIG. 5.
Figure 7:
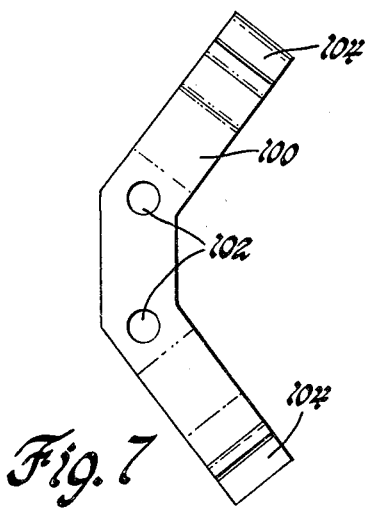
FIG. 7 is an alternative embodiment of a turn signal switch actuator detail according to the invention.

As shown in FIGS. 5 and 6 the actual turn signal switches are keyboard switches 90 identical to the switches 54 mounted on the circuit board 16 on either side of the actuator 28 near the outer limit of the travel of the actuator during its pivotal movement. A spring member comprising a flexible lever 92 has one end fastened to the circuit board by a rivet 94 and a bent tab 96 on the end extends through a hole 98 in the circuit board to secure the flexible lever against turning about the rivet 94. The other end of the lever 92 extends above the switch in a generally S shaped curve and terminates at a point in the path of the actuator 28. The intermediate part of the lever at the bottom of the S shaped curve is in contact with the keyboard switch 90 but normally does not produce sufficient force to close the switch. When, however, the actuator 28 moves against the S shaped portion of the lever, then the lever tends to pivot down about the rivet 94 as a fulcrum thereby applying sufficient force to the keyboard switch to cause it to close. Due to the flexibility of the lever 92, the actuator 28 may move in its path beyond the point when the switch closing takes place so that the design or manufacturing tolerance of the switch assembly is not critical for proper operation of the turn signal switches. A separate spring lever 92 is mounted at each side of the actuator 28 for actuation of the right and left turn signal switches respectively. FIG. 7, however, shows a unitary spring lever assembly 100 equivalent to two conjoined spring levers 92 with holes 102 for riveting to the circuit board and opposite ends 104 properly positioned for the actuation of each turn signal switch.

It will thus be seen that the multiple function switch assembly described herein is an easily manufactured construction and even though the actuating lever has degrees of freedom about two different pivot axes only a single leaf spring is required to return the lever to neutral position. The keyboard switch structure is particularly well suited to a system which requires only a pulse input to a remote logic circuit for commanding the desired operation. For example, if a right turn signal is desired, it is necessary only for the right turn signal switch to be closed momentarily and then released and the turn signal will by operation of the circuitry to which it is connected continue to provide the turn signal indication until another pulse is delivered to the logic circuit to command termination of the turn signal indication. Similarly, the momentary operation of the switch 54 is sufficient to turn the headlamps from bright to dim or vice versa. Thus, in the case of the dimmer switch operation as well as the turn signal operation, there is no requirement for holding any switch in a closed state during the entire duration of the desired function and once the command signal has been given, the lever may be released for return to neutral position. It should be noted, however, that the design efficiencies of the present invention are not solely predicated upon the use of the push button switches but rather it is useful as well with conventional switches, the chief feature then being that the single leaf spring is used for returning the lever to neutral position with respect to either of its two degrees of freedom.

The embodiments of the invention in which an exclusive property or privilege is claimed are defined as follows:

1. A multiple function switch for controlling vehicle turn signals and another vehicle function comprising
   support means including a mounting surface,
   turn signal switch means carried by the support means,
   second switch means mounted on the mounting surface, the second switch means being actuable by a force transverse to the mounting surface,
   a manually controlled handle, an actuator mounted to the handle for control by the handle to form a lever assembly, the actuator being pivotally mounted to the support means for rocking movement in a path generally parallel to the mounting surface and about a first axis transverse to the mounting surface, the actuator having a neutral position and being operatively coupled to the turn signal switch means for selective operation thereof upon rocking movement on either side of the neutral position,
   means pivotally mounting the handle to the actuator for rocking movement about a second axis transverse to the first axis, the handle having abutment means movable in an arcuate path transverse to the mounting surface between a neutral position and an actuated position in operating engagement with the second switch means to apply actuating force thereto,
   a ramp surface on the handle disposed at an angle to the mounting surface, and
   resilient means mounted on the support means and slidably bearing on the ramp surface of the handle for providing a force transverse to the mounting surface for urging the handle toward its neutral position and a camming action for urging the actuator toward its neutral position, whereby when the lever assembly is moved to actuate the turn signal switch means or the second switch means a return force is provided by the resilient means.

2. A multiple function switch for controlling vehicle turn signals and another vehicle function comprising
   support means including a mounting surface,
   turn signal switch means carried by the support means,
   second switch means mounted on the mounting surface, the second switch means being actuable by a force transverse to the mounting surface,
   a manually controlled handle, an actuator mounted to the handle for control by the handle to form a lever assembly, the actuator being pivotally mounted to the support means for rocking movement in a path generally parallel to the mounting surface and about a first axis generally perpendicular to the mounting surface, the actuator having a neutral position and being operatively coupled to the turn signal switch means for selective operation thereof upon rocking movement on either side of the neutral position,
   means pivotally mounting the handle to the actuator for rocking movement about a second axis transverse to the first axis, the handle having abutment means movable in an arcuate path substantially perpendicular to the mounting surface between a neutral position spaced from the second switch means and an actuated position in operating engagement with the second switch means to apply actuating force thereto, a V-shaped ramp surface on the handle, each side of the ramp disposed at an angle to the mounting surface, and spring means mounted on the support means and slidably bearing on the ramp surface of the handle for providing a force substantially perpendicular to the mounting surface for urging the handle toward its neutral position and a camming action for urging the actuator toward its neutral position, whereby when the lever assembly is moved to actuate the turn signal switch means or the second switch means a return force is provided by the spring means.

3. A multiple function switch for controlling vehicle turn signals and another vehicle function comprising support means comprising a housing and a circuit board attached thereto defining a switch cavity, the circuit board including a mounting surface, turn signal switch means carried within the switch cavity of the support means, second switch means mounted on the mounting surface in the switch cavity, the second switch means being actuable by a force transverse to the mounting surface, a manually controlled handle, an actuator mounted to the handle for control by the handle to form a lever assembly in the switch cavity with at least part of the lever extending outside the cavity, the actuator being pivotally mounted to the housing for rocking movement in a path generally parallel to the mounting surface and about a first axis generally perpendicular to the mounting surface, the actuator having a neutral position and being operatively coupled to the turn signal switch means for selective operation thereof upon rocking movement on either side of the neutral position, means pivotally mounting the handle to the actuator for rocking movement about a second axis transverse to the first axis, the handle having abutment means movable in an arcuate path transverse to the mounting surface between a neutral position and an actuated position in operating engagement with the second switch means to apply actuating force thereto, the handle including a V-shaped ramp surface having an apex and each side of the ramp on opposite sides of the apex disposed at an angle to the mounting surface, and a generally V-shaped leaf spring having end portions supported on the housing and having an apex slidably bearing on the ramp surface of the handle for providing a force transverse to the mounting surface for urging the handle toward its neutral position and a camming action for urging the actuator by a cam action toward its neutral position, whereby when the lever assembly is moved to actuate a turn signal switch or the second switch means, a return force is provided by the spring.

* * * * *